(12) United States Patent
Sato et al.

(10) Patent No.: US 7,075,237 B2
(45) Date of Patent: Jul. 11, 2006

(54) ILLUMINATION CONTROL APPARATUS AND FAILURE DETECTING APPARATUS

(75) Inventors: Kazuhiko Sato, Kasugai (JP); Hirohito Miyazaki, Gifu (JP); Masaru Ishizaki, Wako (JP)

(73) Assignees: Omron Corporation, Kyoto (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/104,875

(22) Filed: Apr. 13, 2005

(65) Prior Publication Data

US 2005/0225266 A1 Oct. 13, 2005

(30) Foreign Application Priority Data

Apr. 13, 2004 (JP) .............................. 2004-118152

(51) Int. Cl.
*B60Q 1/02* (2006.01)
*B60Q 1/26* (2006.01)

(52) U.S. Cl. ............................ 315/82; 315/77; 315/78; 315/80; 315/291; 307/10.1; 307/10.8

(58) Field of Classification Search ............ 315/77–80, 315/82–83, 291, 119; 307/10.8, 10.1
See application file for complete search history.

(56) References Cited

U.S. PATENT DOCUMENTS

| 5,438,237 | A | * | 8/1995 | Mullins et al. ................ 315/82 |
| 5,841,203 | A | * | 11/1998 | Chambers et al. ......... 307/10.8 |
| 6,060,834 | A | * | 5/2000 | Vilkinofsky et al. .......... 315/82 |
| 6,281,631 | B1 | * | 8/2001 | Schaffer et al. ................ 315/82 |
| 6,566,816 | B1 | * | 5/2003 | Fushimi et al. ............... 315/82 |

FOREIGN PATENT DOCUMENTS

| JP | 04-342632 | 11/1992 |
| JP | 10-86746 | 4/1998 |

OTHER PUBLICATIONS

Patent Abstracts of Japan, Publication No.: 04-342632, Publication Date: Nov. 30, 1992, 1 page.
Partial Translation of Japanese Publication No.: 10-86746, Publication Date: Apr. 7, 1998, 2 pages.

* cited by examiner

*Primary Examiner*—Don Wong
*Assistant Examiner*—Chuc Tran
(74) *Attorney, Agent, or Firm*—Osha Liang L.L.P.

(57) ABSTRACT

In an illumination control apparatus which drives headlamps in a PWM mode and automatically lights them at low power in a vehicle when the DRL executing condition is held, failure in a PWM-drive switching device and break failure in the lamp are detected as well as the arrangement of control units is optimized and meeting models is facilitated. A relay which switches between lamps and a power source, a CPU which is connected to a CAN and drive-controls the relay for manual lighting, and an integrator circuit which integrates voltage of drive side terminals of the lamps are disposed in a main control unit. An FET which switches between the lamps and the power source, a CPU which drive-controls the FET for automatic lighting, and a power source connecting resister having a resistance value greater enough than that of the lamp that drive side terminals of the lamps are connected to the power source through an ignition switch contact of the vehicle are disposed in a DRL control unit. The CPU determines failure based on the output voltage of the integrator circuit.

6 Claims, 6 Drawing Sheets

PWM WAVEFORM BEFORE CONVERTED (RECTANGULAR WAVE)

FIG. 4C

SAWTOOTH WAVEFORM AFTER CONVERTED

FIG. 5A

| SYMBOL | NUMERIC VALUE | REMARKS |
|---|---|---|
| R1 | 10kΩ | |
| R2 | 100kΩ | |
| C1 | 0.047 μF | |
| Va | 1V | SETTING IS REQUIRED WITHIN POWER SOURCE VOLTAGE OF THE MICROCOMPUTER |
| Vb | 4V | SETTING IS REQUIRED WITHIN POWER SOURCE VOLTAGE OF THE MICROCOMPUTER |
| T | 9.6ms | PWM CYCLE |
| Tc | 4.8ms | SETTING FROM THE COMPUTING SPEED AND PERFORMANCE OF THE MICROCOMPUTER |
| N | 100 TIMES | THE SAME AS ABOVE, AND SETTING FROM THE VALUE OF (T-Tc), THE GREATER IT IS, THE HIGHER RELIABILITY IS |
| Nd | 70 TIMES | SETTING FROM THE CALCULATION RESULT |
| V0 | 12V | THE GENERAL VALUE OF BATTERY VOLTAGE |
| Vf | 0.6V | THE GENERAL VALUE OF THE DIODE |
| Vz | 5V | THE GENERAL VALUE FOR PROTECTING THE MICROCOMPUTER |
| Don | 10% | |

FIG. 5B

| SYMBOL | NUMERIC VALUE | REMARKS |
|---|---|---|
| R1 | 10kΩ | |
| R2 | 100kΩ | |
| C1 | 0.47 μF | |
| Va | 1V | SETTING IS REQUIRED WITHIN POWER SOURCE VOLTAGE OF THE MICROCOMPUTER |
| Vb | 4V | SETTING IS REQUIRED WITHIN POWER SOURCE VOLTAGE OF THE MICROCOMPUTER |
| T | 9.6ms | PWM CYCLE |
| V0 | 12V | THE GENERAL VALUE OF BATTERY VOLTAGE |
| Vf | 0.6V | THE GENERAL VALUE OF THE DIODE |
| Vz | 5V | THE GENERAL VALUE FOR PROTECTING THE MICROCOMPUTER |
| Don | 10% | |

| SYMBOL | NUMERIC VALUE | REMARKS |
|---|---|---|
| Rb1 | 1Ω | |
| Rb2 | 1Ω | |
| R0 | 1kΩ | |
| R1 | 10kΩ | |
| R2 | 100kΩ | |
| C1 | 0.047 μF | |
| Vth | 2.5V | SETTING IS REQUIRED WITHIN POWER SOURCE VOLTAGE OF THE MICROCOMPUTER |
| VBAT | 12V | THE GENERAL VALUE OF BATTERY VOLTAGE |
| Vf | 0.6V | THE GENERAL VALUE OF THE DIODE |
| Vz | 5V | THE GENERAL VALUE FOR PROTECTING THE MICROCOMPUTER |

ILLUMINATION CONTROL APPARATUS AND FAILURE DETECTING APPARATUS

BACKGROUND OF THE INVENTION

1. Field of the Invention

The present invention relates to an illumination control apparatus having a DRL automatic lighting function that automatically lights an illuminating lamp at power (lower light quantity) lower than that in normal lighting in a vehicle when a DRL executing condition is held.

2. Description of the Related Art

In vehicles of four-wheel cars, there is a model which is equipped with a function of automatically executing an operation called DRL (Daytime Running Lights) that lights illuminating lamps (for example, headlight lamps) for safe drive in daytime (in this specification, it is called a DRL automatic lighting function as the case may be). The DRL automatic lighting function is to automatically light illuminating lamps when a predetermined DRL executing condition is held (for example, an ignition switch is on, a parking brake is off, and a user does not effect any manual lighting operations for illumination). In the DRL automatic lighting function, generally for securing safety against an oncoming car and for energy saving, lamps are lit in light quantity lower than the manual lighting state by a user's manipulation (typically, the lighting state in running at night) as voltage applied to the lamps is lowered. Therefore, when the DRL automatic lighting function is operated, the lamps are PWM-driven by using a switching device such as an FET, for example. For an illumination control apparatus for controlling the lamps, an apparatus having the DRL drive function for lamps like this is equipped.

Patent Reference 1 describes an automobile head lamp control circuit having the DRL automatic lighting function described above. The circuit implements the DRL automatic lighting function by PWM-driving high beam lamps under control by a microcomputer when a DRL executing condition is held.

Patent References 2 and 3 disclose techniques relating to detecting a break in a lamp in vehicles.

Patent Reference 1 JP-A-10-86746
Patent Reference 2 JP-A-4-342632
Patent Reference 3 JP-UM-A-4-60732

SUMMARY OF THE INVENTION

The illumination control apparatus having the DRL automatic lighting function described above does not traditionally have a function that detects break failure in a lamp (including a break in wiring electrically equivalent to the break failure in a lamp), or on-failure and off-failure in a DRL switching device (failure that the conducting state between the terminals of the DRL switching device remains off or on, or failure electrically equivalent to that failure; hereinafter, it is called DRL failure as the case may be). Thus, in case where this failure occurs and lamps are not lit, a user is unlikely to know that the DRL automatic lighting function is not working and a vehicle is kept running in daytime. When failure occurs as the DRL switching device remains on, the lamps are lit but they emit light in normal output to raise a problem in securing safety against an oncoming car and in power consumption. Since lighting in normal illumination is done by a user's manipulation in running at night (or by a function that automatically lights lamps when it is dark), a user is highly likely to know failure (lamps are not lit, or remain lit) even though a failure detection function is not equipped. However, in the case of the DRL automatic lighting function with the purpose of lighting lamps in daytime, a user is highly likely not to know failure for a long time because it is light. Thus, it is really necessary to detect failure.

As the circuit described in Patent Reference 1, when a set of a control module (a microcomputer 3 in the example of Patent Reference 1) and a switching device (a semiconductor switching device 1 in the example of Patent Reference 1) implements both of the control circuit for the DRL automatic lighting function and the control circuit for normal manual lighting, problems arise that it is difficult to optimize the arrangement of the control unit and to meet models (to efficiently produce models with the DRL automatic lighting function and models without the function). Namely, a control unit for headlights is generally placed in an engine room for facilitating wiring between the headlights and the control unit. However, when a switching device is PWM-driven for DRL, a problem arises that it is difficult to prevent the switching device from overheating in the engine room where temperatures increase in running. Then, it is considered that the entire control unit is placed outside the engine room (that is, in a car room), but the entire control unit cannot sometimes be placed in the car room because of empty space in the car room. Also in this case, the arrangement of the entire control unit is varied in the model with the DRL automatic lighting function and the model without the DRL automatic lighting function, and thus it is difficult to meet the models. For the switching device of drive control for headlights (simple on-off control), generally, an electromagnetic relay is often used. In this case, for the model without the DRL automatic lighting function, its control unit has an electromagnetic relay as the switching device, whereas for the model with the DRL automatic lighting function, its control unit has a semiconductor device such as an FET allowing PWM-drive as the switching device. Consequently, control units are totally different depending on models, and it is difficult to meet the models as well.

The inventors investigate that the control unit is separated into a main control unit which conducts lighting control (lighting control in accordance with manual operations) for normal headlights and a DRL control unit (DRL control unit) which conducts DRL lighting control and the individual control units are provided with separate control modules such as switching devices and CPUs for driving lights. However in this case, it is a problem that which configuration is formed to detect the failure described above. Particularly, when failure monitoring is done by the main control unit, the CPU of the main control unit cannot recognize on-off timing for PWM drive, and thus a problem arises that it is difficult to determine the failure in the DRL switching device in the DRL control unit. More specifically, for general methods for determining the failure in the switching device PWM-driven, there is a method that monitors whether the terminal voltage of the switching device and load (lamps of headlights) has a proper value (high potential or low potential) in accordance with periods in the on period or the off period for PWM drive. Of course, a premise is that on-off timing for PWM drive is recognized (in other words, monitoring timing for terminal voltage needs to be synchronized with on-off timing for PWM drive). For example, since the CPU for PWM-drive control can of course recognize on-off timing for PWM drive, monitoring timing for terminal voltage can be synchronized with on-off timing for PWM drive, and the failure in the switching device can be determined by the method described above. However, when one of the CPUs separately disposed in the control units conducts PWM drive and the other CPU determines the failure in the switching device for PWM drive by the method described above, it is not feasible because the other CPU cannot accurately recognize on-off timing for PWM drive. Thus, a technique that can determine the failure in the switching device for PWM drive is required even in the control module that cannot recognize on-off timing for PWM drive.

The invention has been made in view of the circumstances. An object is to provide a failure detecting apparatus which can determine the failure in a switching device for PWM drive even in a control module that cannot recognize on-off timing for PWM drive, and an illumination control apparatus with a DRL automatic lighting function for vehicles which utilizes the technique of this failure detecting apparatus and can determine at least the failure in the switching device described above.

An illumination control apparatus of the application is an illumination control apparatus having a DRL automatic lighting function that drives an illuminating lamp in a PWM mode and automatically lights the lamp at lower power than in normal lighting in a vehicle when a DRL executing condition is held, the illumination control apparatus including:

a DRL switching device which switches between the lamp and a power source;

a DRL control module which drive-controls the DRL switching device for automatic lighting;

an integrator circuit which integrates voltage of a drive side terminal of the lamp; and a switch failure determining module which determines on-failure and off-failure in the DRL switching device based on output voltage of the integrator circuit in a state (that is, in a state that it is PWM-driven) that the DRL switching device is driven for automatic lighting.

Here, 'the power source' which 'switches between the lamp and the power source' means that it is on the high potential side of the power source when the lamp is in high-side drive, whereas it is on the low potential side of the power source when the lamp is in low-side drive. It is acceptable that 'the DRL switching device' is a switching device exclusive use for DRL automatic lighting, but it is also acceptable that it also serves for drive control in normal lighting. 'The drive side terminal of the lamp' means the terminal on the side where the DRL switching device is disposed.

Figure 2:
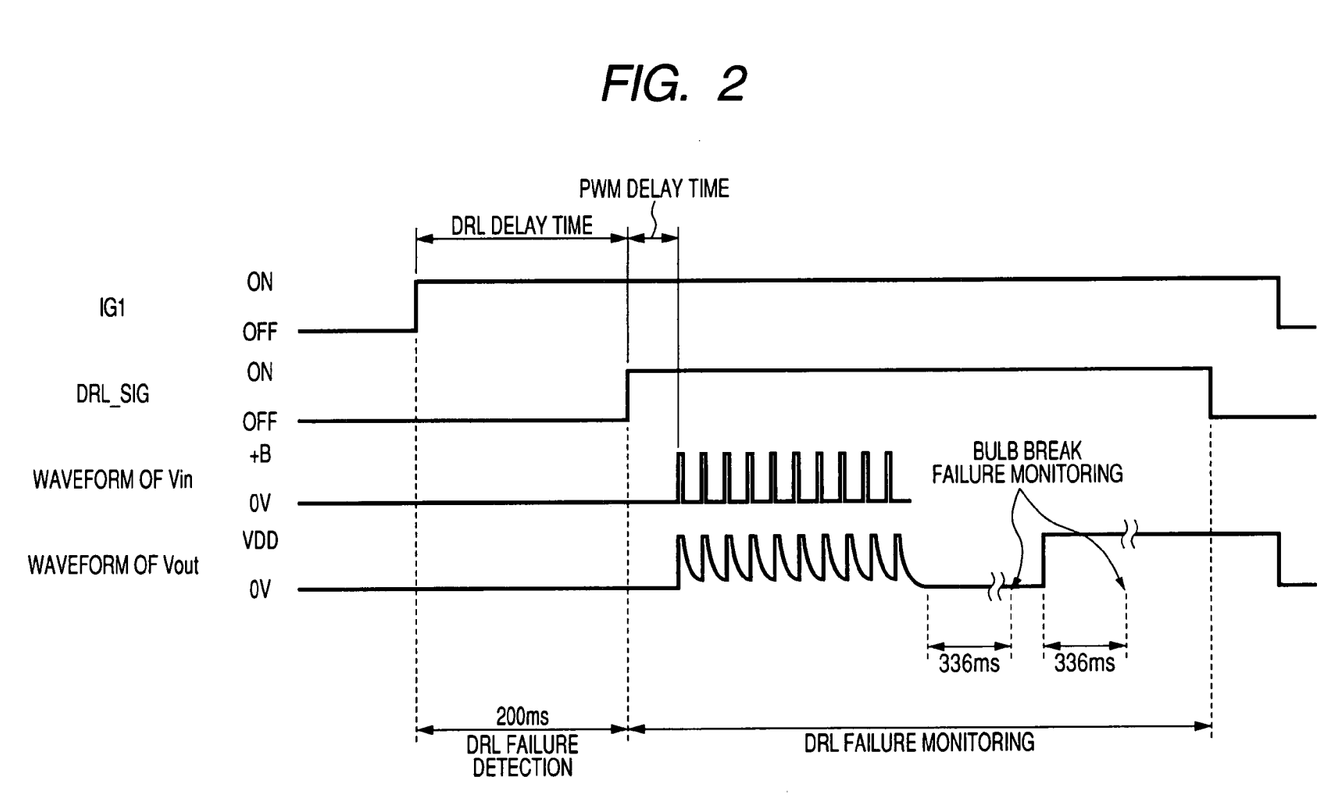
FIG. 2 is a timing chart for describing a determination process for DRL failure.

In the illumination control apparatus, the DRL failure is determined based on the output voltage of the integrator circuit in the state that the DRL switching device is PWM-driven (that is, in the DRL operating state that the DRL automatic lighting function is working). Therefore, the DRL failure can be detected accurately even though on-off timing for PWM drive cannot be recognized in the control module configuring the switch failure determining module (even though on-off timing for PWM drive cannot be synchronized). That is, for example, as shown in FIG. 2, in the DRL operating state, the drive side terminal voltage of the lamp (the input voltage Vin of the integrator circuit) is a waveform in a pulse form (rectangular wave form) in normal operation with no failure described above, and the output voltage Vout of the integrator circuit that has integrated this is a sawtooth waveform. However, in failure that the DRL failure occurs, the output voltage of the integrator circuit remains in one of high potential and low potential as shown in the right side of FIG. 2, for example, even in the DRL operating state. Thus, as in the exemplary embodiment described later, for example, it is determined as failure when the output voltage of the integrator circuit is periodically monitored (sampled) and high potential or low potential is detected at a predetermined ratio or above, and thus the DRL failure can be determined accurately.

Here, monitoring the voltage that the integrator circuit has integrated the drive side terminal voltage to determine failure exerts the following effect. More specifically, suppose the drive side terminal voltage (PWM output) itself is monitored to similarly determine failure, defectives are likely to occur that voltage is continuously determined only in one of the on period and the off period in the duty cycles of PWM drive to determine failure even though it is normal depending on timing of sampling the drive side terminal voltage, and that it is not returned normal (or it is not returned for a long time) after it is determined as failure. When this problem is to be solved, it is required that on-off timing for PWM drive is grasped to synchronize the sampling timing with on-off timing for PWM drive. However, since the voltage after integrated is a sawtooth waveform, the intermediate potential is detected at many timings, the likeliness to generate the defectives described above is dramatically reduced and it is not necessary to synchronize timing for PWM drive (that is, it is unnecessary to recognize on-off timing for PWM drive in the switch failure determining module). Therefore, according to the illumination control apparatus of this application, the switch failure determining module can be implemented by the control module separated from the DRL control module, and a control unit can be easily separated into two as described later, for example.

Next, a preferred embodiment of the illumination control apparatus of the application includes:

a main switching device which is disposed in parallel with the DRL switching device and switches between the lamp and the power source is provided separately from the DRL switching device, and a main control module which drive-controls the main switching device for normally lighting the lamp is provided separately from the DRL control module;

the main switching device, the main control module and the integrator circuit are disposed in the main control unit;

the DRL switching device and the DRL control module are disposed in a DRL control unit separately from the main control unit; and the switch failure determining module is configured of the main control module.

Here, 'the normal lighting' means lighting the lamp by manual operations (manual lighting), not DRL lighting for lamps (driving the lamp at low power), including automatically lighting the lamps when it is dark as the case may be.

In this embodiment, the arrangement of the control units can be optimized, and meeting models can be facilitated. More specifically, since the DRL switching device that has a problem of overheating is disposed in the DRL control unit separate from the main control unit, it is placed inside the car room to facilitate preventing overheating. On the other hand, the main control unit can be placed in the engine room in the traditional manner to be shared by the model with the DRL automatic lighting function and the model without the DRL automatic lighting function. Thus, the DRL control unit is added to slightly modify wiring to facilitate remodeling the model without the DRL automatic lighting function into the model with that function or to facilitate altering the specifications, and therefore meeting the models can be facilitated. Since the DRL control unit is modified to easily alter the specifications of the DRL automatic lighting function, meeting the models can be facilitated in this point.

In the embodiment, since the switch failure determining module is configured of the main control module (that is, the main control module is configured to do the determination process for the DRL failure), control over devices for automobile use in accordance with the result of failure determination (for example, lighting control over the lamp which tells failure to a user) can be facilitated. That is, for example, when an instruction is outputted through a car communication network (CAN, for example) to light a lamp which tells failure, suppose the configuration is that the DRL control module conducts the determination process for the DRL failure, it is required that the DRL control module is also connected to the communication network and that a signal line is disposed which sends information about the determined result of the DRL failure from the DRL control module to the main control module (the necessity to increase wiring between the main control unit and the DRL control unit). However in the embodiment, since the main control module which is of course connected to the car communication network is configured to do the determination process for the DRL failure, there is no need to provide a new signal line in this manner.

In this case, the control module (DRL control module) for PWM drive is separated from the control module (main control module) for the determination process for the DRL failure, and the main control module for the determination process for the DRL failure cannot accurately grasp on-off timing for PWM drive. However, since failure is detected by the output voltage of the integrator circuit, the DRL failure can be detected enough with no synchronization as described above.

Next, another preferred embodiment of the illumination control apparatus of the application includes:

a power source connecting line which is disposed in parallel with the DRL switching device and connects the drive side terminal of the lamp to the power source though an ignition switch contact of the vehicle;

a power source connecting resister which is disposed on the power source connecting line and has a resistance value greater enough than that of the lamp;

a lamp failure determining module which determines break failure in the lamp based on voltage of the drive side terminal of the lamp or output voltage of the integrator circuit in a state that the ignition switch contact is on and the lamp is not driven.

Here, 'the power source connecting resister' means resister which carries weak current through the lamp to the extent that the lamp are not lit when the ignition switch is on and no problem is caused in the point of power consumption. 'The state that the lamp is not driven' does not include the state of the off period in PWM drive.

According to the embodiment, the failure determining module determines the break failure in the lamp based on the voltage of the drive side terminal of the lamp or the output voltage of the integrator circuit in the state that the ignition switch contact is on and the lamp is not driven (in the state that the switching device for driving the lamp is off). Therefore, in addition to the DRL failure, the break failure in the lamp can be detected accurately as well.

More specifically, the drive side terminal of the lamp is separately connected to the power source through the ignition switch contact and the power source connecting line, and the power source connecting resister having a resistance value greater enough than that of the lamp is disposed on the power source connecting line. Thus, even though the switching device for driving the lamp is off, weak current (current to the extent that does not light the lamps) is carried through the lamp via the power source connecting line as long as the ignition switch contact is on and there is no break failure inside the lamp or its terminal connecting part. Therefore, the voltage of the drive side terminal or the output voltage of the integrator circuit is turned to one of high voltage (High) or low voltage (Low) by the influence of a voltage drop of the power source connecting resister in normal operation with no break failure (it is low voltage when the lamp is in high-side drive, whereas it is high voltage when the lamp is in low-side drive), and it is turned to the other of high voltage (High) or low voltage (Low) in failure with the break failure (it is high voltage when the lamp is in high-side drive, whereas it is low voltage when the lamp is in low-side drive). Accordingly, the apparatus can accurately determine whether there is break failure based on the voltages.

Since the output voltage of the integrator circuit is equivalent to the voltage of the drive side terminal (that is, the input voltage of the integrator circuit) for determining the break failure in the lamp, it is acceptable that any voltage is used to determine the break failure. However, when the output voltage of the integrator circuit is used, the monitoring voltage is equal between the DRL failure described above and the break failure. Thus, there is an advantage to share these voltage input parts for the control module.

Also in the embodiment to also conduct the break failure in the lamp as described above, desirably, the control unit is configured to be divided into two as described above. In this case, the main switching device, the main control module and the integrator circuit are disposed in the main control unit, the DRL switching device, the DRL control module and the power source connecting resister are disposed in the DRL control unit, and the switch failure determining module and the lamp failure determining module are implemented by the main control module.

Next, a failure detecting apparatus of the application will be described. The failure detecting apparatus of the application generalizes the failure determination technique applied to the illumination control apparatus of the application, which has the following characteristic.

More specifically, a failure detecting apparatus which detects on-failure and off-failure in a switching device in a system having the switching device which is connected between a load and a power source and PWM-driven, the failure detecting apparatus includes:

an integrator circuit which integrates voltage of a drive side terminal of the load; and a switch failure determining module which determines on-failure and off-failure in the switching device based on output voltage of the integrator circuit in a state that the DRL switching device is PWM-driven.

Here, 'the system' is not limited to the system for automobile use. The load is not limited to the lamp for the vehicle, which can be every electrical device.

More specifically, the switch failure determining module determines on-failure and off-failure in the switching device in the following principle, for example. That is, it monitors output voltage of the integrator circuit at a cycle shorter enough than a cycle for PWM drive, and determines that on-failure or off-failure has been generated in the switching device based on detection that high potential or low potential out of a range of a predetermined intermediate potential or detection that high potential or low potential is detected at a ratio exceeding a predetermined ratio in monitoring the voltage.

Also in the failure detecting apparatus, as similar to the illumination control apparatus described above, even though the control module configuring the switch failure determining module cannot recognize on-off timing for PWM drive, on-failure or off-failure in the switching device can be detected accurately.

According to the invention, even though the control module configuring the switch failure determining module cannot recognize on-off timing for PWM drive (even though it cannot be synchronized with on-off timing for PWM drive), on-failure or off-failure in the switching device can be detected accurately.

BRIEF DESCRIPTION OF THE DRAWINGS

The teachings of the invention can be readily understood by considering the following detailed description in conjunction with the accompanying drawings, in which.

DESCRIPTION OF THE PREFERRED EMBODIMENT

Hereinafter, an example of an embodiment according to the invention will be described based on the drawings.

Figure 1:
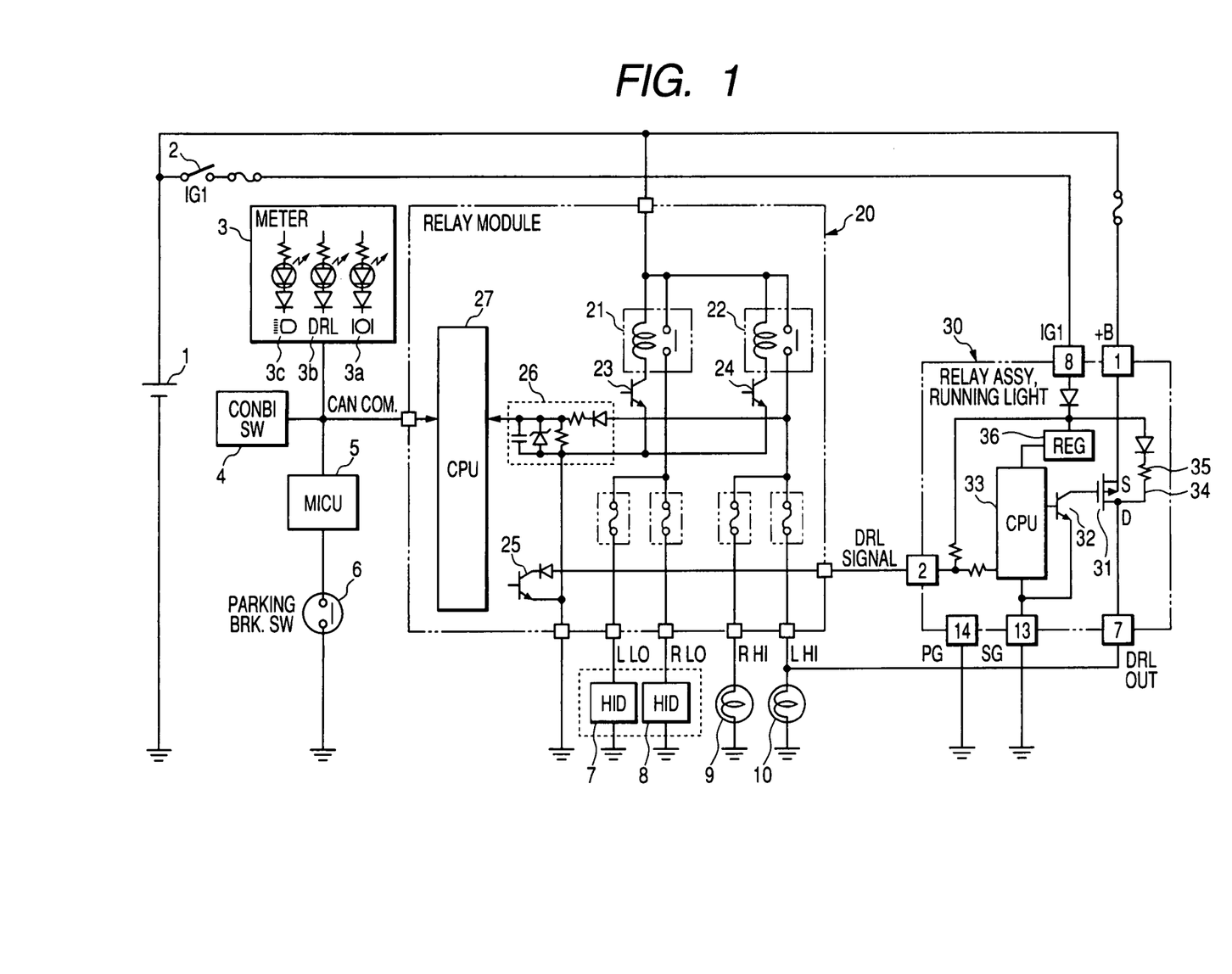
FIG. 1 is a circuit diagram illustrating an illumination control apparatus.
Figure 3:
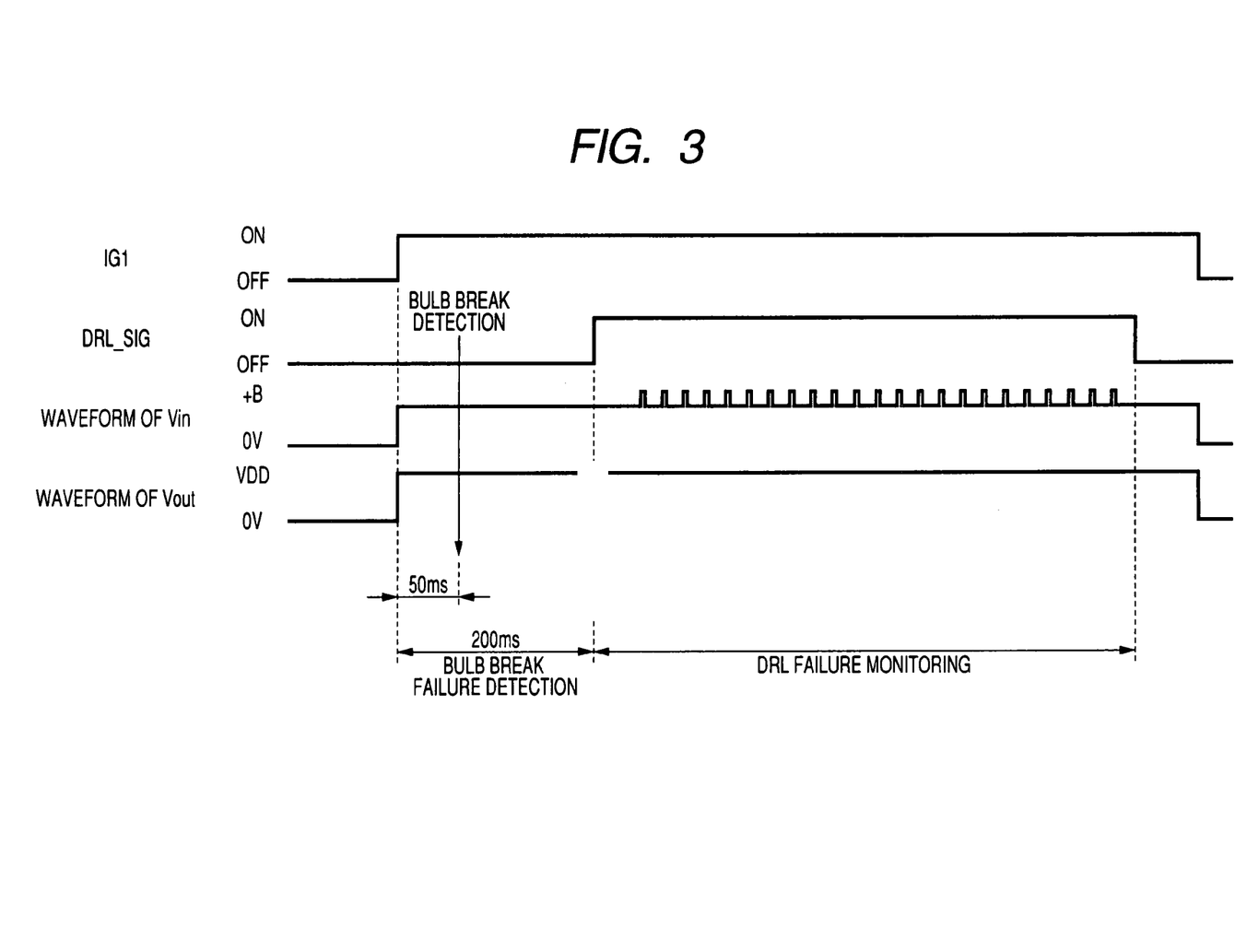
FIG. 3 is a timing chart for describing a determination process for lamp break failure.
Figure 4A:
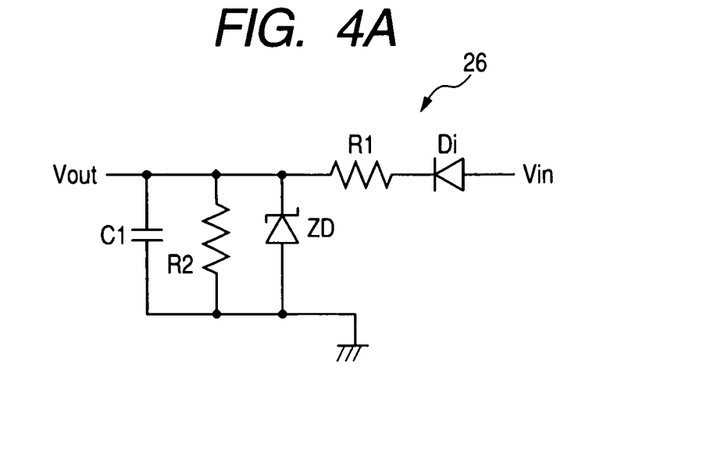
FIGS. 4A, 4B and 4C are diagrams for describing the detail of an integrator circuit.
Figure 4B:
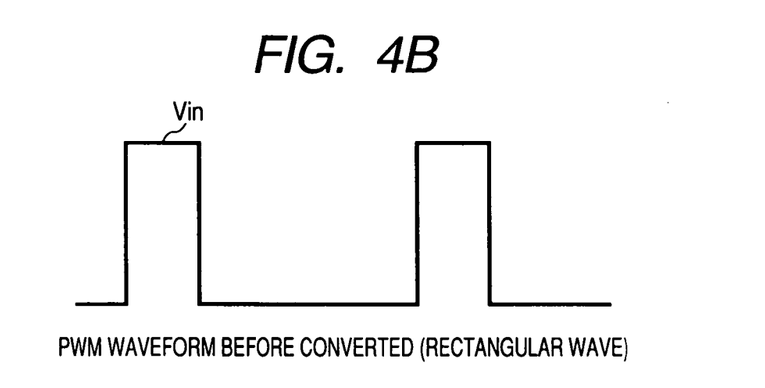
Figure 4C:
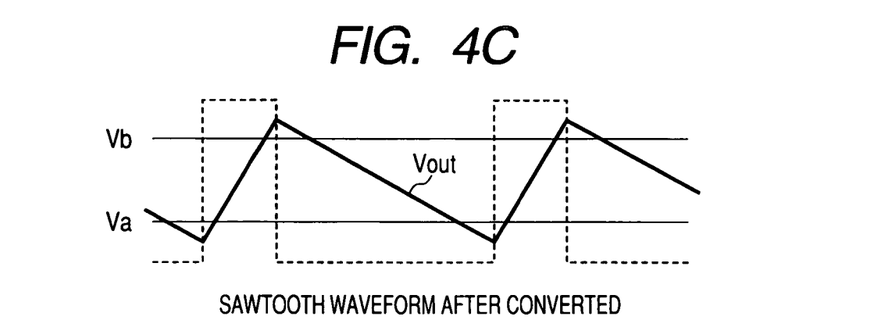
Figure 5A:
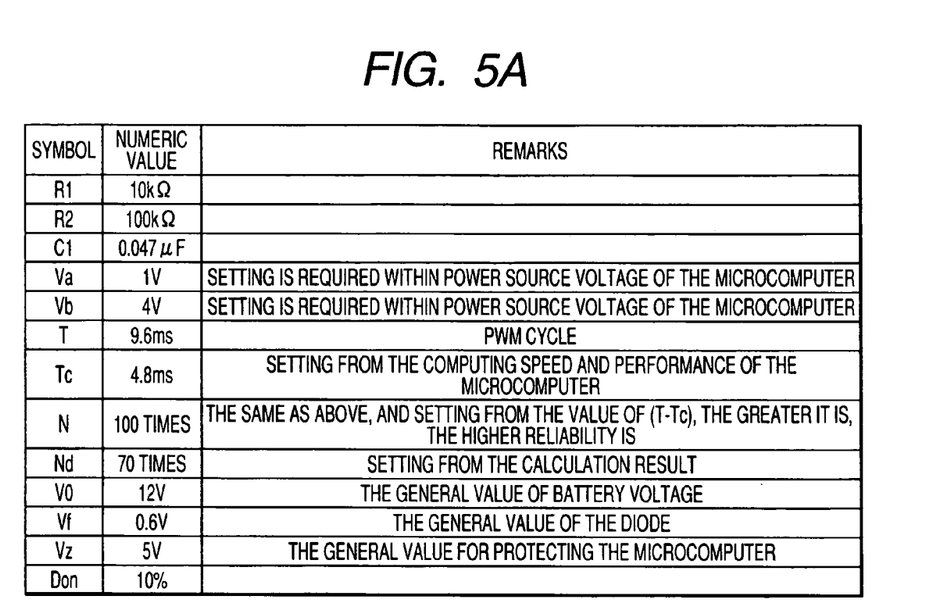
FIGS. 5A and 5B are diagrams for describing setting various numeric values for determining DRL failure.
Figure 5B:
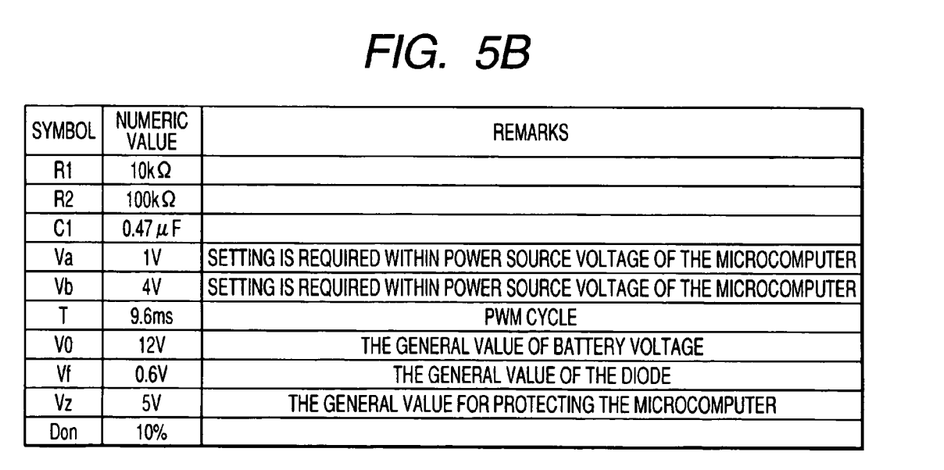
Figure 6A:
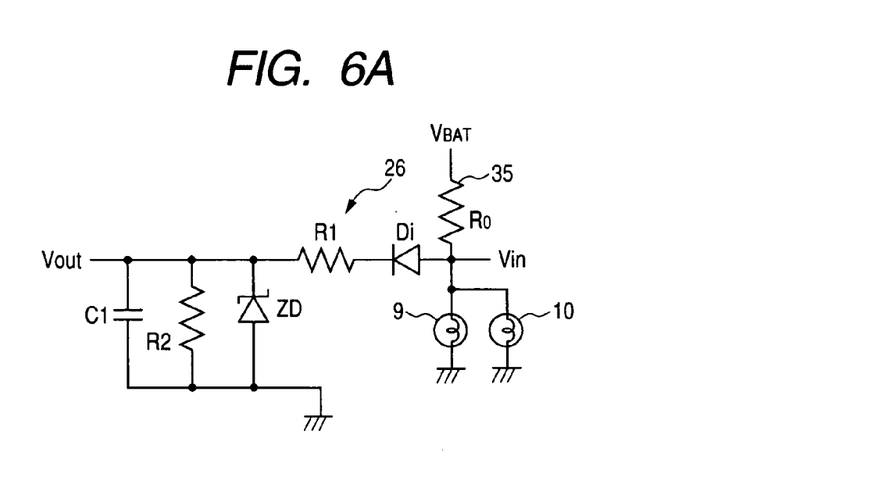
FIGS. 6A and 6B are diagrams for describing setting various numeric values for determining lamp break failure.
Figure 6B:
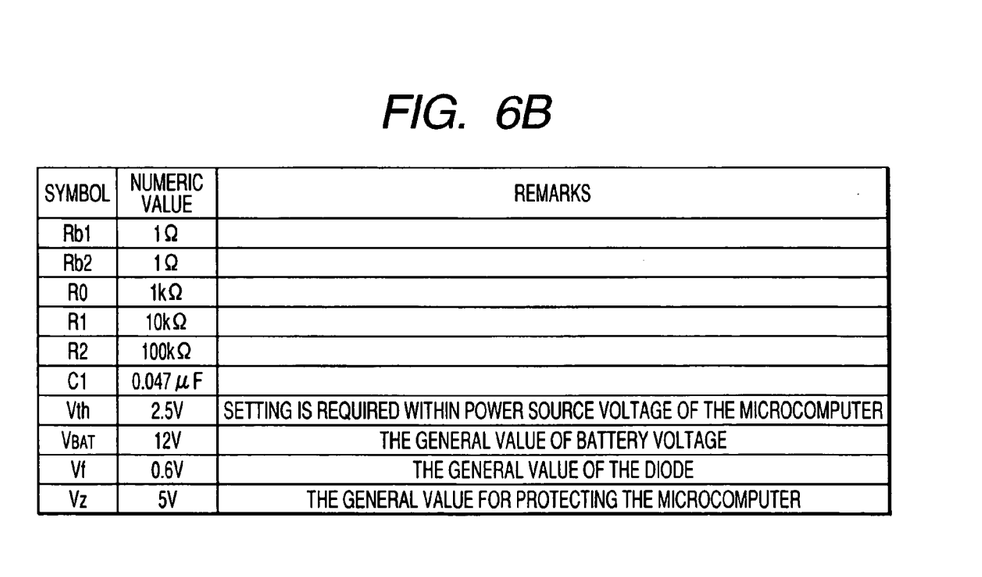

FIG. 1 is a circuit diagram illustrating an illumination control apparatus of the embodiment. FIG. 2 is a timing chart for describing a determination process for DRL failure. FIG. 3 is a timing chart for describing a determination process for lamp break failure. FIGS. 4A, 4B and 4C are diagrams for describing the detail of an integrator circuit. FIGS. 5A and 5B are diagrams for describing setting various numeric values for DRL failure. FIGS. 6A and 6B are diagrams for describing setting various numeric values for lamp break failure.

As shown in FIG. 1, the illumination control apparatus of the embodiment has a main control unit 20 and a DRL control unit 30.

In FIG. 1, sign 1 denotes a battery (power source) for a vehicle, sign 2 denotes an ignition switch contact (IG1), sign 3 denotes an indicator which is disposed at a driver seat, sign 4 denotes a combination switch which is disposed at the driver seat and operated by a driver, sign 5 denotes an integrated controller for CAN inside the vehicle placed at footing of the driver seat, and sign 6 is a parking brake switch which is turned on when a parking brake is operated. Signs 7 and 8 are right and left lamps for headlight low beams and signs 9 and 10 are right and left lamps for headlight high beams. In the embodiment, the headlight high beam lamps 9 and 10 are automatically lit in the DRL operation, but the configuration is acceptable that the other lamps (for example, headlight low-beam lamps, or lamps exclusive use for DRL) are automatically lit in the DRL operation. Also in this case, when the parking brake switch 6 is turned on, a parking brake indicating part 3a of the indicator 3 is lit. As shown in FIG. 1, diodes for back-flow prevention and fuses for overcurrent protection are disposed at many places in the circuit, but signs and description for these are omitted.

The main control unit 20 has relays 21 and 22 (main switching devices) which switch between the lamps 7 and 8 or 9 and 10 and the high potential side of a power source, transistors 23 and 24 which switch current carrying lines for coils of the relays 21 and 22 and drive-control the relays 21 and 22, a transistor 25 which outputs a DRL signal (in this case, an active low signal) when a DRL executing condition is held, an integrator circuit 26 which integrates the voltage of a drive side terminal (in this case, a high potential side terminal) of the lamps 9 and 10, and a CPU 27 (main control module) which is connected to the CAN and controls the transistors 23, 24 and 25.

Drive circuits of the transistors 23, 24 and 25 are omitted in the drawing.

Here, the integrator circuit 26 is configured to have a zener diode as shown in FIG. 1 or FIG. 4A, and the maximum voltage is limited to 5V, for example. Also in this case, the output voltage of the integrator circuit 26 is inputted to the AD input of the CPU 27 to read its voltage value.

As shown in FIG. 2 or FIGS. 4B and 4C, the integrator circuit 26 has the characteristic that converts the rectangular waveform of PWM output to a sawtooth waveform. The sawtooth waveform is used to read intermediate potential at a predetermined ratio or above in sampling for failure determination by the CPU 27, described later (the detail will be described later). For example, when the PWM-drive cycle by a CPU 33 is 9.6 msec and the cycle for monitoring the output voltage of the integrator circuit 26 (sampling cycle) by the CPU 27 is 4.8 msec, the waveform is read such that the intermediate potential (for example, 1V to 4V) is read for above 30 times in sampling for 100 times when it is the normal condition. The inventors confirm that a waveform like this can be easily set by the integrator circuit as shown in FIG. 1 by simulations.

Next, the DRL control unit 30 has an FET 31 (DRL switching device) which is disposed in parallel with the relays 21 and 22 (main switching devices) of the main control unit 20 and switches between the lamps 9 and 10 and the high potential side of the power source, the CPU 33 (DRL control module) which drive-controls the FET 31 for the DRL operation through a transistor 32, a power source connecting line 34 which is disposed in parallel with the FET 31 and connects the drive side terminals of the lamps 9 and 10 to the high potential side of the power source through the ignition switch contact 2 of the vehicle, a power source connecting resister 35 which is disposed on the power source connecting line 34 and has a resistance value greater enough than that of the lamps 9 and 10 (a resister which carries weak current through the lamps 9 and 10 to the extent that the lamps 9 and 10 are not lit and no problem is caused in power consumption), and a regulator 36 which stabilizes the power source voltage inputted through the ignition switch contact 2 and inputs it to the CPU 33.

Here, the DRL signal (the output signal of the transistor 25) from the main control unit 20 is inputted to the CPU 33 (DRL control module) of the DRL control unit 30. It is configured in which when the DRL signal is turned active as the ignition switch contact 2 is turned on, the CPU 33 PWM-drives the FET 31 at a predetermined duty after a slight delay time (for example, 20 msec; hereinafter, it is called PWM delay time) and the lamps 9 and 10 are lit at low power in the DRL operation.

The CPU 27 (main control module) of the main control unit 20 has an operation program set therein that is recorded in a RAM, not shown, in order to implement the following function.

More specifically, when the combination switch 4 is operated to receive a signal to instruct manually lighting the headlights (the lamps 7 and 8 or 9 and 10) from a CAN bus, the relay 21 or 22 is operated through the transistor 23 or 24 and the battery voltage $V_{BAT}$ is applied to the lamps 7 and 8 or 9 and 10 to light them. When the lamps 9 and 10 (headlight high beams) are manually lit in this way, a high beam indicating part 3c of the indicator 3 is lit.

When the CPU 27 determines from information obtained from the CAN bus that a predetermined DRL executing condition is held (for example, the ignition switch contact 2 is on, the parking brake switch 6 is off and the combination switch 4 does not effect the manual lighting operation for the headlights), it operates the transistor 25 to turn the DRL signal active. In this case, when the ignition switch contact 2 is turned on from off, the CPU 27 determines whether the DRL executing condition is held based on the received data from the CAN bus during a predetermined delay time (for example, 200 msec; hereinafter, it is called DRL delay time). When it determines that it is held, it turns the DRL signal (DRL_SIG) active after the DRL delay time has elapsed (see FIG. 2).

When the ignition switch contact 2 (IG1) is turned on, the CPU 27 determines the break failure in the lamps 9 and 10 based on the voltage of the drive side terminals of the lamps 9 and 10 (in this case, the output voltage of the integrator circuit 26) during the DRL delay time. More specifically, for example, in the case where the lamps 9 and 10 are not lit during the DRL delay time, when the voltage is sampled at every 4.8 msec and compared with a threshold value (for example, 2.5V), and then the voltage of the threshold value or above is continuously detected for about 50 msec or longer (that is, 10 times or above), it is determined that a break failure is generated (see FIG. 3).

When it is determined that the break failure is generated, in this case, the CPU 27 sends information indicating the break failure on the CAN bus to light a DRL failure indicating part 3b of the indicator 3 in DRL control (when the DRL signal is active). The state that the break failure is detected is held as long as the ignition switch contact 2 is on.

As the FET 31 (DRL switching device) is PWM-driven (the DRL signal is turned active), the CPU 27 determines on-failure and off-failure in the FET 31 (the DRL failure described above) based on the voltage of the drive side terminals of the lamps 9 and 10 (in this case, the output voltage of the integrator circuit 26) (the detail will be described later). More specifically, for example, when the voltage is sampled at every 4.8 msec (at every half cycle of PWM) and compared with the threshold value (for example, High level is 4V or above, and Low level is 1V or below) and High level or Low level is detected for 70 times or above in sampling for 100 times for about 0.5 seconds, it is determined that the on-failure or off-failure in the FET 31 is generated. In sampling for 100 times, the number of times to detect High level or Low level is below 70 times, it is determined as normal (the on-failure or off-failure in the FET 31 is not generated, or it is returned to normal).

Also in this case, when it is determined that failure is generated, the CPU 27 sends information indicating the failure on the CAN bus to light the DRL failure indicating part 3b of the indicator 3.

For the failure determination, it is acceptable that on-failure is distinguished from off-failure. More specifically, this form is acceptable that when High level is detected for 70 times or above in sampling for 100 times, for example, it is determined that the on-failure in the FET 31 is generated, whereas when Low level is detected for 70 times or above, it is determined that the off-failure in the FET 31 is generated.

The illumination control apparatus of the embodiment described above incorporates a failure detecting apparatus of the application, which has the following advantage.

More specifically, in the illumination control apparatus, the DRL failure is determined based on the output voltage of the integrator circuit 26 in the state that the DRL switching device (FET 31) is PWM-driven (that is, in the DRL operating state that the DRL automatic lighting function is working). Therefore, the DRL failure can be detected accurately even though on-off timing for PWM drive cannot be recognized in the control module (CPU 27) that configures the switch failure determining module (even though on-off timing for PWM drive by the CPU 33 cannot be synchronized).

Because, for example, as shown in FIG. 2, in normal operation with no failure, the drive side terminal voltage of the lamps (the input voltage Vin of the integrator circuit) is a waveform in a pulse form (rectangular wave form) in the DRL operating state, and the output voltage Vout of the integrator circuit 26 that the waveform is integrated is a sawtooth waveform. However, in failure that the DRL failure is generated, the output voltage of the integrator circuit remains in one of high potential and low potential as shown in the right side of FIG. 2, for example, even in the DRL operating state. Thus, for example, it is determined as failure when the output voltage of the integrator circuit 26 is periodically monitored (sampled) and high potential or low potential is detected at a predetermined ratio or above, and thus the DRL failure can be accurately determined. In the case of FIG. 2, since the monitoring cycle Tc, described later, is 4.8 msec and the number of times to detect the potential except the intermediate potential (High level or Low level) (the number of times that determines failure) Nd is 70 times, DRL failure is determined after as short as 336 msec (4.8 msec×70) has elapsed from when the failure was generated.

Here, monitoring the voltage that the integrator circuit 26 has integrated the drive side terminal voltage to determine failure exerts the following effect. More specifically, suppose the drive side terminal voltage (PWM output) itself is monitored to similarly determine failure, defectives are likely to occur that voltage is continuously determined only in one of the on period and the off period in the duty cycles of PWM drive to determine failure even though it is normal depending on timing of sampling the drive side terminal voltage, and that it is not returned normal (or it is not returned for a long time) after it is determined as failure. When this problem is to be solved without extremely shortening the monitoring cycle for voltage (without increasing processing load of the CPU), it is required that on-off timing for PWM drive is grasped to synchronize sampling timing with on-off timing for PWM drive. However, since the voltage after integrated is a sawtooth waveform, the intermediate potential is detected at many timings, the likeliness to generate the defectives described above is dramatically reduced and it is not necessary to synchronize timing for PWM drive (that is, it is unnecessary to recognize on-off timing for PWM drive in the switch failure determining module).

Therefore, according to the illumination control apparatus of this application, the switch failure determining module can be implemented by the control module (CPU 27) separated from the DRL control module (CPU 33), and the control unit can be easily separated into two as described above.

The illumination control apparatus of the embodiment has the main switching device (relay 22) which is disposed in parallel with the DRL switching device (FET 31) and switches between the lamps 9 and 10 and the power source separately from the DRL switching device; and has the main control module (CPU 27) which drive-controls the main switching device for normally lighting the lamps 9 and 10 separately from the DRL control module (CPU 33); the main switching device, the main control module, and the integrator circuit 26 are disposed in the main control unit 20; the DRL switching device and the DRL control module are disposed in the DRL control unit 30 separately from the main control unit 20; and the switch failure determining module is configured of the main control module (CPU 27).

Therefore, the arrangement of the control units can be optimized, and meeting models can be facilitated. More specifically, since the DRL switching device (FET 31) that has a problem of overheating is disposed in the DRL control unit 30 separately from the main control unit 20, it is placed inside the car room to facilitate preventing overheating. On the other hand, the main control unit 20 can be placed in the engine room in the traditional manner to be nearly shared by the model with the DRL automatic lighting function and the model without the DRL automatic lighting function. Thus, the DRL control unit 30 is added to slightly modify wiring to facilitate remodeling the model without the DRL automatic lighting function into the model with that function or altering the specifications, and therefore meeting the models can be facilitated. The DRL control unit 30 is modified to easily alter the specifications of the DRL automatic lighting function, and thus meeting the model can be facilitated in this point.

In the embodiment, since the switch failure determining module is configured of the main control module (CPU 27) (that is, the CPU 27 is configured to do the determination process for the DRL failure), control over devices for automobile use in accordance with the result of failure determination (for example, lighting control over the lamp 3b which tells failure to a user) is facilitated. That is, for example, when an instruction is outputted through the car communication network (CAN) to light a lamp which tells failure, suppose the configuration is that the DRL control module (CPU 33) conducts the determination process for the DRL failure, it is required that the DRL control module (CPU 33) is also connected to the communication network or that a signal line is disposed which sends information about the determined result of the DRL failure from the DRL control module to the main control module (the necessity to increase wiring between the main control unit 20 and the DRL control unit 30). However in the embodiment, since the main control module (the CPU 27 which is of course connected to the car communication network) is configured to do the determination process for the DRL failure, there is no need to provide a new signal line in this manner.

In the illumination control apparatus of the application, the CPU 27 determines the break failure in the lamps 9 and 10 based on the power source connecting line 34 which is disposed in parallel with the DRL switching device and connects the drive side terminals of the lamps 9 and 10 to the power source through the ignition switch contact 2 of the vehicle, the power source connecting resister 35 which is disposed on the power source connecting line 34 and has a resistance value greater enough than that of the lamps, and the output voltage of the integrator circuit 26 in the state that the ignition switch contact 2 is turned on and the lamps 9 and 10 are not driven. Therefore, in addition to the DRL failure described above, the break failure in the lamps 9 and 10 can be detected accurately as well.

More specifically, the drive side terminals of the lamps 9 and 10 are separately connected to the high potential side of the power source through the ignition switch contact 2 and the power source connecting line 34 (that is, separately from the normal current carrying line with the relay 22), and the power source connecting resister 35 having a resistance value greater enough than that of the lamps 9 and 10 is disposed on the power source connecting line 34. Thus, even though the switching device for driving the lamps (the relay 22 and the FET 31) is off, weak current (current to the extent that does not light the lamps) is carried through the lamps 9 and 10 via the power source connecting line 34 as long as the ignition switch contact 2 is on and there is no break failure inside the lamp or its terminal connecting part. Therefore, the output voltage of the integrator circuit 26 is turned to low voltage (Low) by the influence of a voltage drop of the power source connecting resister 35 in normal operation with no break failure, whereas it is turned to high voltage (High) in failure with break failure. Accordingly, the apparatus can accurately determine whether there is break failure based on the voltage.

For example, FIG. 3 shows the case where the ignition switch is turned on as break failure is generated. In this case, the ignition switch is turned on, and then the break failure is detected after as short as about 50 msec has elapsed. This is because when the monitoring cycle for the voltage is 4.8 msec and the voltage of the threshold value or above is continuously detected for 10 times or above, for example, it is determined that the break failure is generated.

The output voltage Vout of the integrator circuit 26 momentarily delays at rise time or fall time. However, since it is equivalent to the voltage of the drive side terminals of the lamps 9 and 10 (that is, the input voltage Vin of the integrator circuit 26) for the break failure in the lamp, it is acceptable that either voltage (Vin or Vout) is used to determine the break failure. However, when the output voltage of the integrator circuit 26 is used, the monitoring voltage is equal between the DRL failure described above and the break failure. Thus, there is an advantage to share these voltage input parts for the control module (CPU 27).

Next, the specifications of the integrator circuit 26 and the detail of the DRL failure will be described.

First, the symbols of the individual numeric values for determining the DRL failure are defined with reference to FIGS. 4A to 4C. More specifically, the PWM-drive cycle of the FET 31 is T, the duty ratio of the PWM drive is $D_{ON}$, the maximum value of the PWM output (the input voltage Vin of the integrator circuit 26) is $V_0$, the voltage drop of the diode Di (shown in FIG. 4A) of the integrator circuit 26 is Vf, the lower limit of the intermediate potential is Va, the upper limit of the intermediate potential is Vb, the rise time (the time varying from Va to Vb) of the sawtooth waveform (the waveform of the output voltage Vout of the integrator circuit 26) is Tr, the fall time (the time varying from Vb to Va) of the sawtooth waveform is Tf, the number of times for monitoring the voltage Vout (the number of times for sampling) is N, the monitoring cycle (sampling cycle) for the voltage Vout is Tc, the number of times to detect the potential except the intermediate potential (High level or Low level) (the number of times to determine failure) is Nd, and the zener voltage of the zener diode ZD is Vz. The values for two resisters and the condenser forming the integrator circuit 26 are R1, R2 and C1 (shown in FIG. 4A).

It is fine to set the numeric values R1, R2, C1, Va, Vb, T, Tc, N, Nd, $V_0$, Vf, and Vz so as to satisfy Equation 1. However, Tr and Tf in Equation 1 can be determined by Equation 2, for example.

In the case where they are set in this manner, when the DRL failure is being generated, the potential except the intermediate potential is almost always detected at Nd times or above in monitoring the voltage Vout at N times. In reverse, in the normal operation when the DRL failure is not generated, the intermediate potential is always detected at (N-Nd) times in monitoring the voltage Vout at N times. Therefore, when the configuration is formed that it is determined that the DRL failure is generated when the potential except the intermediate potential is detected at Nd times or above in monitoring the voltage Vout at N times, the DRL failure can be detected accurately, highly reliably, regardless of on-off timing for PWM drive. FIG. 5A illustrates the concrete examples and description of the numeric values.

[Equation 1]

When Tc≦T−(Tr+Tf), $$Nd > \frac{T - (Tr + Tf)}{Tc} \cdot N$$

where Tc, T<Tr+Tf (Tc and T are smaller than Tr+Tf).

When Tc<T−(Tr+Tf), $$Nd > \frac{T - (Tr + Tf)}{Tc} \cdot N$$

where Tc, T<Tr+Tf (Tc and T are smaller than Tr+Tf).

$$Tr = C_1 R_1 R \cdot \ln \frac{R(V_0 - V_f) - V_a}{R(V_0 - V_f) - V_b},$$ [Equation 2]

$$R = \frac{R_2}{R_1 + R_2}$$

$$T_f = C_1 R_2 \cdot \ln \frac{V_b}{V_a}$$

Setting the individual numeric values for determining the DRL failure is not limited to the embodiment. For example, when variations in the PWM output (variations in the peak voltage, frequencies and the duty ratio) are small, the configuration is fine that satisfies Equation 3. In this case, since the sawtooth waveform (the waveform of the output voltage Vout of the integrator circuit 26) is in the range from Va to Vb (in the intermediate potential) all the time in normal, the DRL failure can be determined at the time when the output voltage Vout is the potential except the intermediate potential (it is Va or below or Vb or above).

FIG. 5B illustrates the concrete examples and description of the numeric values in this case.

$$T_r > D_{on} \cdot T \; T_f > (1 - D_{on}) \cdot T$$ [Equation 3]

Next, the detail of determining the break failure in the lamp will be described.

First, the symbols of individual numeric values for determining the break failure in the lamp are defined with reference to FIG. 6A (however, those common with determining the DRL failure are omitted in description). More specifically, the power source voltage of the battery of the vehicle is $V_{BAT}$, the resisters of the lamps 9 and 10 are $R_{b1}$ and $R_{b2}$, the threshold value voltage (the voltage to determine the failure) is $V_{th}$, and the resistance value of the power source connecting resister 35 is $R_0$.

In order to determine the break failure in the lamp, it is fine to set the threshold value voltage $V_{th}$ and the resistance value $R_0$ so as to hold the relationship expressed by Equation 4.

When they are set in this manner, the voltage $V_{out}$ is always greater than the threshold value voltage $V_{th}$ when the break failure is being generated in the lamp. Therefore, it is configured to determine that the break failure is generated when the voltage of the threshold value or above is continuously detected as the voltage $V_{out}$ for about 50 msec or longer (that is, 10 times or above), for example, and thus the break failure can be detected accurately, highly reliably.

FIG. 6B illustrates the concrete examples and description of the numeric values in this case.

$$V_{th} < (V_{BAT} - V_f) \frac{R_2}{R_0 + R_1 + R_2}$$ [Equation 4]

where $V_{th}$<Vz, and $R_{b1}$, $R_{b2}$<<$R_0$.

The invention is not limited to the embodiment described above, and there can be various modifications and applications.

For example, the invention can be applied to the low-side drive type in principles that the switching device is connected to the low potential side of the lamp (load) (the type like Patent Reference 2).

The basic invention of the application can be applied to the configuration that the switching device is common for manual operation and DRL operation (the configuration like Patent Reference 1). For example, it is acceptable that an integrator circuit is disposed which integrates the output voltage (the drive side terminal voltage of the high beam lamps) of the semiconductor switching device 1 in the apparatus of Patent Reference 1 and failure in the semiconductor switching device 1 is determined by a microcomputer separate from the microcomputer 3 based on the output of the integrator circuit.

In the exemplary form shown in FIG. 1, it is fine to provide the function that the CPU 27 automatically drives the relay 21 or 22 to light the headlamps at night.

What is claimed is:

1. An illumination control apparatus having a DRL automatic lighting function that drives an illuminating lamp in a PWM mode and automatically lights the lamp at lower power than in normal lighting in a vehicle when a DRL executing condition is held, the illumination control apparatus comprising:

a DRL switching device which switches between the lamp and a power source;

a DRL control module which drive-controls the DRL switching device for automatic lighting;

an integrator circuit which integrates voltage of a drive side terminal of the lamp; and a switch failure determining module which determines on-failure and off-failure in the DRL switching device based on output voltage of the integrator circuit in a state that the DRL switching device is driven for automatic lighting.

2. The illumination control apparatus according to claim 1,
wherein a main switching device which is disposed in parallel with the DRL switching device and switches between the lamp and the power source is provided separately from the DRL switching device, and a main control module which drive-controls the main switching device for normally lighting the lamp is provided separately from the DRL control module;
the main switching device, the main control module and the integrator circuit are disposed in the main control unit;
the DRL switching device and the DRL control module are disposed in a DRL control unit separately from the main control unit; and
the switch failure determining module is configured of the main control module.

3. The illumination control apparatus according to claim 1, comprising:
a power source connecting line which is disposed in parallel with the DRL switching device and connects the drive side terminal of the lamp to the power source though an ignition switch contact of the vehicle;
a power source connecting resister which is disposed on the power source connecting line and has a resistance value greater enough than that of the lamp;
a lamp failure determining module which determines break failure in the lamp based on voltage of the drive side terminal of the lamp or output voltage of the integrator circuit in a state that the ignition switch contact is on and the lamp is not driven.

4. The illumination control apparatus according to claim 3, wherein
a main switching device which is disposed in parallel with the DRL switching device and switches between the lamp and the power source is provided separately from the DRL switching device, and a main control module which drive-controls the main switching device for normally lighting the lamp is provided separately from the DRL control module;
the main switching device, the main control module and the integrator circuit are disposed in the main control unit;
the DRL switching device, the DRL control module and the power source connecting resister are disposed in a DRL control unit separately from the main control unit; and
the switch failure determining module and the lamp failure determining module are configured of the main control module.

5. A failure detecting apparatus which detects on-failure and off-failure in a switching device in a system having the switching device which is connected between a load and a power source and PWM-driven, the failure detecting apparatus comprising:
an integrator circuit which integrates voltage of a drive side terminal of the load; and
a switch failure determining module which determines on-failure and off-failure in the switching device based on output voltage of the integrator circuit in a state that the DRL switching device is PWM-driven.

6. The failure detecting apparatus according to claim 5, wherein the switch failure determining module monitors output voltage of the integrator circuit at a cycle shorter enough than a cycle for PWM drive, and determines that on-failure or off-failure has been generated in the switching device based on detection that high potential or low potential out of a range of a predetermined intermediate potential or detection that high potential or low potential is detected at a ratio exceeding a predetermined ratio in monitoring the voltage.

* * * * *